United States Patent
Hayes et al.

(10) Patent No.: US 9,269,998 B2
(45) Date of Patent: Feb. 23, 2016

(54) CONCAVE GAS VENT FOR ELECTROCHEMICAL CELL

(71) Applicant: Fluidic, Inc., Scottsdale, AZ (US)

(72) Inventors: Joel Hayes, Chandler, AZ (US); Andrew Goodfellow, Phoenix, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 98 days.

(21) Appl. No.: 14/207,148

(22) Filed: Mar. 12, 2014

(65) Prior Publication Data

US 2014/0262760 A1   Sep. 18, 2014

Related U.S. Application Data

(60) Provisional application No. 61/780,007, filed on Mar. 13, 2014.

(51) Int. Cl.
*H01M 12/08* (2006.01)
*H01M 2/12* (2006.01)
(Continued)

(52) U.S. Cl.
CPC ............ *H01M 12/08* (2013.01); *H01M 2/1258* (2013.01); *H01M 2/1264* (2013.01); *C25B 1/04* (2013.01); *C25B 9/00* (2013.01); *C25B 15/08* (2013.01)

(58) Field of Classification Search
CPC . H01M 2/1264; H01M 2/1258; H01M 12/08; B01D 36/0001; C25B 15/08; C25B 9/00; C25B 1/04
See application file for complete search history.

(56) References Cited

U.S. PATENT DOCUMENTS 3,686,225 A   8/1972 Pedersen et al.
3,888,877 A   6/1975 Lehn (Continued)

FOREIGN PATENT DOCUMENTS

EP   0037634 A1   10/1981
EP   0832502 B1   4/1998
EP   0987349 B1   3/2000

OTHER PUBLICATIONS

Agrawal, R. C., et al., "Study of Electrical and Electrochemical Behaviour on Hot-press Synthesized Nano-Composite Polymer Electrolyte (NCPE) Membranes: [(70PEO: 30 KNO3) + x SiO2]", Int. J. Electrochem. Sci., vol. 6, pp. 867-881 (2011).

(Continued)

*Primary Examiner* — Patrick Ryan
*Assistant Examiner* — Aaron Greso
(74) *Attorney, Agent, or Firm* — Pillsbury Winthrop Shaw Pittman, LLP

(57) ABSTRACT

The invention provides an electrochemical cell system comprising: a fuel electrode, an oxidant electrode for absorbing and reducing a gaseous oxidant, and an interior cell chamber configured to contain a volume of ionically conductive liquid therein. The ionically conductive liquid conducts ions between the fuel and oxidant electrodes. The oxidant electrode separates the ionically conductive liquid from the gaseous oxidant. A gas vent is configured to separate gas in the cell from a mist comprising the ionically conductive liquid and is positioned generally above the volume of ionically conductive liquid. The gas vent comprises a filter body portion comprised of at least one layer so as to absorb a portion of the ionically conductive liquid. The body portion is formed in a concave shape with an apex positioned towards the top of the cell in its upright orientation, and with body surfaces extending downwardly from said apex so as to drain absorbed ionically conductive medium back into the interior chamber. The body portion contains pores so as to permit permeation of the gas therethrough.

15 Claims, 2 Drawing Sheets

(51) Int. Cl.
    *C25B 15/08*    (2006.01)
    *C25B 1/04*    (2006.01)
    *C25B 9/00*    (2006.01)

(56) References Cited

U.S. PATENT DOCUMENTS

| | | |
|---|---|---|
| 3,945,849 A | 3/1976 | Hoffman |
| 3,965,116 A | 6/1976 | Cram |
| 3,966,766 A | 6/1976 | Lehn |
| 4,001,212 A | 1/1977 | Richman |
| 4,001,279 A | 1/1977 | Cram |
| 4,076,600 A | 2/1978 | Huebner |
| 4,117,205 A | 9/1978 | Kitai |
| 4,132,837 A | 1/1979 | Soffer |
| 4,265,789 A | 5/1981 | Christopherson et al. |
| 4,375,427 A | 3/1983 | Miller et al. |
| 4,479,856 A | 10/1984 | Ando |
| 4,535,039 A | 8/1985 | Naarmann et al. |
| 4,670,363 A | 6/1987 | Whitney et al. |
| 4,869,979 A | 9/1989 | Ohtani et al. |
| 4,952,289 A | 8/1990 | Ciccone et al. |
| 5,041,194 A | 8/1991 | Mori et al. |
| 5,130,211 A | 7/1992 | Wilkinson et al. |
| 5,188,914 A | 2/1993 | Blomgren et al. |
| 5,200,057 A | 4/1993 | Canaris |
| 5,419,987 A | 5/1995 | Goldstein et al. |
| 5,445,724 A | 8/1995 | Burkhart et al. |
| 5,512,391 A | 4/1996 | Fleischer |
| 5,569,560 A | 10/1996 | Olsen et al. |
| 5,731,105 A | 3/1998 | Fleischer et al. |
| 5,789,585 A | 8/1998 | Lee et al. |
| 5,840,443 A | 11/1998 | Gregg et al. |
| 5,990,352 A | 11/1999 | Nobori et al. |
| 6,120,941 A | 9/2000 | Lee et al. |
| 6,300,015 B1 | 10/2001 | Nishiyama et al. |
| 6,368,741 B1 | 4/2002 | Hackel et al. |
| 6,465,643 B1 | 10/2002 | Schiemenz et al. |
| 6,541,151 B2 | 4/2003 | Minamiura et al. |
| 6,645,904 B2 | 11/2003 | Schiemenz et al. |
| 6,666,909 B1 * | 12/2003 | TeGrotenhuis et al. ......... 95/273 |
| 6,776,929 B2 | 8/2004 | Hossan et al. |
| 6,790,265 B2 | 9/2004 | Joshi et al. |
| 6,811,819 B2 | 11/2004 | Joshi et al. |
| 6,899,974 B2 | 5/2005 | Kamisuki |
| 6,949,310 B2 | 9/2005 | Phillips et al. |
| 6,962,992 B2 | 11/2005 | Martin et al. |
| 7,285,362 B2 | 10/2007 | Harrup et al. |
| 7,964,300 B2 | 6/2011 | Nakazawa et al. |
| 7,997,425 B2 | 8/2011 | Golden et al. |
| 8,168,337 B2 | 5/2012 | Friesen et al. |
| 8,309,259 B2 | 11/2012 | Friesen et al. |
| 2004/0029723 A1 | 2/2004 | Schiemenz et al. |
| 2004/0104124 A1 | 6/2004 | Cobley et al. |
| 2009/0163394 A1 | 6/2009 | Muraishi et al. |
| 2010/0119895 A1 | 5/2010 | Friesen et al. |
| 2010/0119956 A1 | 5/2010 | Tokuda et al. |
| 2010/0266907 A1 | 10/2010 | Yazami et al. |
| 2010/0285375 A1 * | 11/2010 | Friesen et al. ............... 429/405 |
| 2010/0316935 A1 | 12/2010 | Friesen et al. |
| 2011/0023428 A1 | 2/2011 | Ziebold et al. |
| 2011/0059355 A1 | 3/2011 | Zhang et al. |
| 2011/0070506 A1 | 3/2011 | Friesen et al. |
| 2011/0086278 A1 | 4/2011 | Friesen et al. |
| 2011/0143219 A1 | 6/2011 | Weiss et al. |
| 2011/0200893 A1 | 8/2011 | Friesen et al. |
| 2011/0250512 A1 | 10/2011 | Friesen et al. |
| 2011/0316485 A1 | 12/2011 | Krishnan et al. |
| 2012/0015264 A1 | 1/2012 | Friesen et al. |
| 2012/0068667 A1 | 3/2012 | Friesen et al. |
| 2012/0098499 A1 | 4/2012 | Friesen et al. |
| 2012/0139496 A1 | 6/2012 | Krishnan et al. |
| 2012/0202127 A1 | 8/2012 | Friesen et al. |
| 2012/0321969 A1 | 12/2012 | Friesen et al. |
| 2013/0095393 A1 * | 4/2013 | Friesen et al. ............... 429/404 |
| 2013/0115523 A1 | 5/2013 | Friesen et al. |
| 2013/0115526 A1 | 5/2013 | Friesen et al. |
| 2013/0115532 A1 | 5/2013 | Friesen et al. |
| 2013/0115533 A1 * | 5/2013 | Friesen et al. ............... 429/409 |
| 2014/0091631 A1 | 4/2014 | Naden et al. |

OTHER PUBLICATIONS

Park, C. H., et al., "Electrochemical stability and conductivity enhancement of composite polymer electrolytes", Solid State Ionics, vol. 159, pp. 111-119 (2003).

Li, Q., et al., "All solid lithium polymer batteries with a novel composite polymer electrolyte", Solid State Ionics, vol. 159 pp. 97-109 (2003).

Dias, F. B., et al., "Trends in polymer electrolytes for secondary lithium batteries", Journal of Power Soruces, vol. 88, pp. 169-191 (2000).

* cited by examiner

CONCAVE GAS VENT FOR ELECTROCHEMICAL CELL

CROSS-REFERENCE TO PRIOR APPLICATION

This application claims benefit to prior U.S. Patent Provisional Application Ser. No. 61/780,007 filed 13 Mar. 2014, the content of which is incorporated herein by reference in its entirety.

FIELD

The present invention is generally related to electrochemical cells, and more particularly to electrochemical cells utilizing a liquid ionically conductive medium.

BACKGROUND

Many types of electrochemical cells utilize a liquid ionically conductive medium to support electrochemical reactions within the cell. For example, a metal-air electrochemical cell system may comprise one or more cells, each having a fuel electrode serving as an anode at which metal fuel is oxidized, and an air breathing oxidant electrode at which oxygen from ambient air is reduced. The liquid ionically conductive medium in such cells may communicate the oxidized/reduced ions between the electrodes.

In some electrochemical cell systems, various gasses may evolve during the charging and/or discharging of the cell. Such gasses may be harmful to the cell, and may damage or impede performance of the cell. For example, in some cases the cell may be harmed due to the evolved gasses increasing pressure within a confined area in the cell. In some cases, the cell (and potentially its surroundings) may be harmed due to the evolution of a potentially volatile gas or combination of gasses. As such, some electrochemical cells are configured to disperse such gasses by including vents therein, so that gasses may escape into the ambient environment. For example, U.S. patent application Ser. No. 13/566,948, incorporated herein in its entirety by reference, discloses a membrane gas vent configured to disperse gases out of an electrochemical cell. As another example, U.S. patent application Ser. No. 13/666,864, incorporated herein in its entirety by reference, discloses a hydrophilic gas vent configured to disperse gases out of an electrochemical cell. Other electrochemical cells may be configured with pressure relief valves, which are typically closed, however open when the pressure within the cell exceeds a threshold amount.

In some electrochemical cell systems comprising liquid electrolytes, various gases evolved may entrain small amounts of liquid electrolyte therein and the cell (and potentially its surroundings) may be harmed due to the evolution of the resulting mist, aerosol or spray. The present application endeavors to provide an effective and improved way of capturing mists or aerosols created by the generation of gas bubbles within a volume of liquid electrolyte in an electrochemical cell and returning the liquid portion of the mist back to the main volume of the liquid electrolyte while dispersing the gas portion of the mist into the ambient environment.

SUMMARY

According to an embodiment of the invention, an electrochemical cell system comprises: a fuel electrode, an oxidant electrode for absorbing and reducing a gaseous oxidant, and an interior cell chamber configured to contain a volume of ionically conductive liquid therein. The ionically conductive liquid conducts ions between the fuel and oxidant electrodes. The oxidant electrode separates the ionically conductive liquid from the gaseous oxidant. A gas vent is configured to separate gas in the cell from a mist comprising the ionically conductive liquid and is positioned generally above the volume of ionically conductive liquid. The gas vent comprises a filter body portion comprised of at least one layer so as to absorb a portion of the ionically conductive liquid. The body portion is formed in a concave shape with an apex positioned towards the top of the cell in its upright orientation, and with body surfaces extending downwardly from said apex so as to drain absorbed ionically conductive medium back into the interior chamber. The body portion contains pores so as to permit permeation of the gas therethrough.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
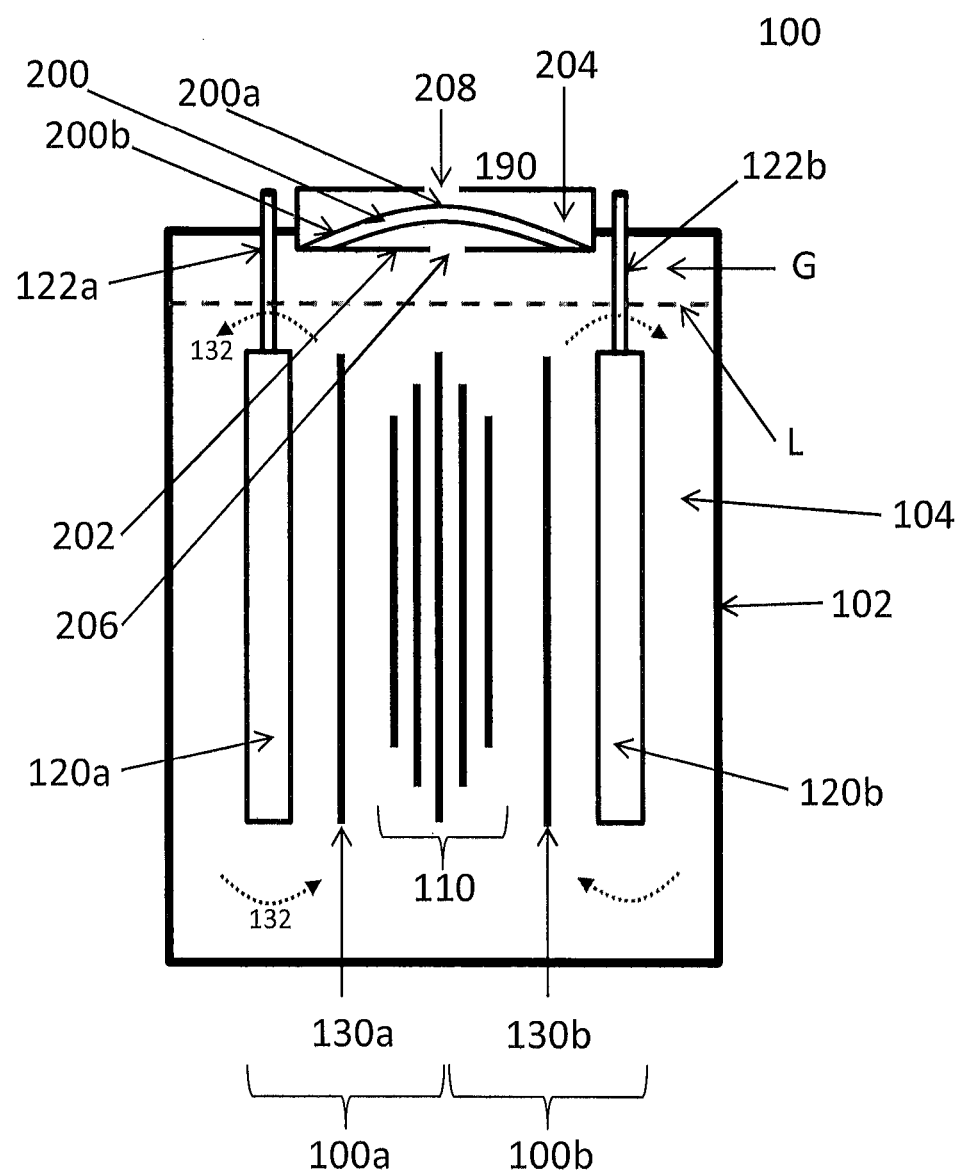
FIG. 1 depicts a schematic view of an electrochemical cell comprising a filter configured to remove ionically conductive medium from gas in the electrochemical cell.

FIG. 1 illustrates a schematic cross sectional view of an electrochemical cell 100. As shown, the components of the electrochemical cell 100 may be contained at least partially in an associated housing 102 defining an interior cell chamber, generally depicted at 104, configured to contain a volume of ionically conductive liquid therein. The cell 100 utilizes a liquid ionically conductive medium that is contained within the housing 102, and is configured to circulate therein to conduct ions within the cell 100. In an embodiment, the amount of liquid ionically conductive medium within the housing 102 may reach a level L, thereby defining a gap G. The gap G may comprise gases which may be associated with the electrochemical reactions occurring within the cell 100 (e.g. oxygen). While at times the ionically conductive medium may be generally stationary within the housing 102, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in the U.S. patent application Ser. Nos. 13/531,962; 13/532,374 and 13/666,864 incorporated herein in their entirety. Various portions of the electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337; 8,309,259; and U.S. patent application Ser. Nos. 12/549,617; 12/631,484; 12/776,962; 12/885,268; 12/901,410; 13/028,496; 13/083,929; 13/167,930; 13/185,658; 13/230,549; 13/299,167; 13/362,775; 13/526,432; 13/531,962; 13/532,374; 13/666,864; 13/668,185; 14/039, 285; and 61/763,428; each of which are incorporated herein in their entireties by reference.

Various components and features of an embodiment are schematically depicted in FIG. 1. Accordingly, defined within the housing 102 of the cell 100 is a cell chamber 104 that is configured to house a liquid ionically conductive medium, and may define a flow therein. A fuel electrode 110 of the cell 100 may be supported in the interior cell chamber 104 so as to be contacted by the ionically conductive medium. In an embodiment, the fuel electrode 110 is a metal fuel electrode that functions as an anode when the cell 100 operates in discharge, or electricity generating mode. As shown, in some embodiments the fuel electrode 110 may comprise a plurality of permeable electrode bodies. Although in the illustrated embodiment five permeable electrode bodies are used, in other embodiments any number of permeable electrode bodies is possible. Each permeable electrode body may include a screen that is made of any formation that is able to capture and retain, through electrodeposition, or otherwise, particles or ions of metal fuel from the ionically conductive medium that flows through or is otherwise present within the cell chamber 104. Further details regarding permeable electrode bodies, configurations and operation thereof may be described in U.S. Pat. Nos. 8,168,337; 8,309,259; Ser. Nos. 12/885,268; 13/167,930; 13/230,549; 13/277,031; 13/299,167; previously incorporated by reference above. Although in the illustrated embodiment, the electrode bodies may have different sizes so that a stepped scaffold configuration may be used, as described by U.S. patent application Ser. No. 13/167,930 and incorporated by reference above, in other embodiments the permeable electrode bodies may have substantially the same size.

In some embodiments of the cell 100, such as that illustrated in FIG. 1, multiple cells may be installed together in a common housing 102. Such an assembly may increase energy and/or power density, may facilitate desired flow directions based on the interaction of bubbles generated from each cell, may reduce production costs by reducing the number of discrete parts therein or otherwise. The assembly of FIG. 1 contains two cells therein, and thus may be referred to as bicell 100. It may be appreciated that the two cells (individually cell 100a and 100b) define bicell 100, although additional cells may also be included in other embodiments (i.e. forming a tricell, a quadcell, or so on). Although in some embodiments each cell 100a and 100b may contain its own associated fuel electrode 110 (i.e. spaced from one another), in other embodiments, such as that shown, bicell 100 contains a common fuel electrode 110 for both cells 100a and 100b. In particular, common fuel electrode 110 is shared by a pair of oxidant reduction electrodes 120a and 120b, associated with cells 100a and 100b, respectively. In some embodiments, electrode bodies of fuel electrode 110 that are proximal to oxidant reduction electrode 120a may be generally considered to be associated with cell 100a, while electrode bodies of fuel electrode 110 that are proximal to oxidant reduction electrode 120b may be generally considered to be associated with cell 100b. In some embodiments, however, the entirety of the common fuel electrode 110 may be understood as participating in electrochemical reactions with both oxidant reduction electrode 120a and oxidant reduction electrode 120b.

In an embodiment, the oxidant reduction electrode 120 may be of any appropriate construction or configuration. For example, the oxidant reduction electrode 120 may generally be configured to support oxygen reduction in the electrochemical cell 100, to create a potential difference with the fuel electrode 110 during discharge of the cell 100. In an embodiment, the oxidant reduction electrode 120 may contain an active layer having meshes or coatings that may be characterized as "active material(s)". The active material(s) facilitate the electrochemical reactions associated with oxygen reduction. Accordingly, in an embodiment, the oxidant electrode 120 is positioned in the cell chamber 104 such that the active materials contact the ionically conductive medium allowing ions to be conducted to and/or from the fuel electrode 110. In some embodiments, the active materials may be formed by a mixture of catalyst particles or materials, conductive matrix and hydrophobic materials, sintered to form a composite material or otherwise layered together. In various embodiments the active materials may be constructed of one or more metals and/or their oxides, such as but not limited to manganese, silver, nickel, platinum, lanthanum, strontium, and cobalt. For further details regarding oxidant electrodes, reference may be made to U.S. patent application Ser. Nos. 13/531,962 13/553,269; 13/668,180; and 13/668,185 previously incorporated herein in their entirety.

In an embodiment, the oxidant reduction electrode 120 may be sealed or otherwise assembled into an oxidant reduction electrode module that is immersed into the ionically conductive medium in the cell chamber 104. At least one air channel 122 may extend into the oxidant reduction electrode module, so as to provide air or any other oxidant to the oxidant reduction electrode 120. Further details of such a configuration are described in U.S. patent application Ser. No. 13/531,962 previously incorporated by reference in its entirety herein. As shown, in embodiments containing a separate charging electrode 130, the charging electrode 130 may be positioned between the oxidant reduction electrode 120 and the fuel electrode 110. In embodiments of the cell 100 lacking a separate charging electrode 130, the oxidant reduction electrode 120 may be utilized both during charging and discharging of the cell 100 (i.e. as an anode during charging and as a cathode during discharging).

In the illustrated embodiment of FIG. 1, associated with each cell 100a and 100b are charging electrodes 130a and 130b. Although in the illustrated embodiment charging electrodes 130a and 130b are spaced from the common fuel electrode 110, it may be appreciated that in some embodiments the charging electrodes 130a and 130b may comprise a portion of the common fuel electrode 110. As shown, the dedicated charging electrodes 130a and 130b may generally be positioned between the common fuel electrode 110 and the oxidant reduction electrodes 120a and 120b; however various other arrangements are also possible. A charging electrode 120 may be positioned spaced from the fuel electrode 110. In some embodiments, the charging electrode 140 may be a portion of the fuel electrode 110 (including, for example, being one or more of the permeable electrode bodies). As with the fuel electrode 110, the charging electrode 130 may be positioned within the cell chamber 104, so as to be in contact with the ionically conductive medium. The charging electrode 130 may be configured to participate in the oxidation of an oxidizable oxidant species, which is present in the liquid ionically conductive medium, so as to promote the reduction of an oxidized metal fuel species and growth of the metal fuel on the fuel electrode 110 during charging of the cell 100. Accordingly, in some embodiments, the charging electrode 130 may be characterized as an oxygen evolving electrode, due to the bubbling off of oxygen gas from the charging electrode 110 during the charging of the electrochemical cell 100.

In an embodiment, bubbles formed during charging may rise from where they are evolved on the charging electrodes 130a and 130b to towards the liquid electrolyte level L, and develop a flow of the ionically conductive medium. It may be appreciated that the spaced arrangement of the charging electrodes 130a and 130b may generally drive the bubbles, and thus the flow, away from one another, over the opposing oxidant reduction electrodes 120a and 120b, a flow pattern which is generally depicted by the arrows at 132.

In an embodiment, the gas bubbles formed during charging may burst upon reaching the liquid electrolyte level L, thereby ejecting a fine mist of liquid electrolyte particles generally depicted at gap G. This mist may comprise very fine liquid electrolyte droplets, for example, varying from approximately 5 microns to below 1 micron. Not to be bound by any particular theory, but the larger droplets may be less influenced by gas flow out of the cell 100 and the force of gravity may pull these larger electrolyte droplets back into the volume of the liquid electrolyte. In contrast, the smaller droplets may flow with the gas exiting the chamber 104 through inlet 206. The forces exerted on the liquid droplets by the convection of gas out of the cell may overcome the gravitational force drawing the droplets down toward the volume of the ionically conductive medium. Consequently, the electrolyte droplets may be transported with the gas exiting the cell through inlet 206. In an embodiment, the gas flow rate associated with the production of gases within the cell 100 may limit the size of electrolyte droplets entrained in the gas flow.

Various other flow patterns of the ionically conductive medium are also possible, for example, such as those described in U.S. patent application Ser. Nos. 13/532,374 and 13/666,864 previously incorporated herein in their entirety. Furthermore, although not illustrated in FIG. 1, in some embodiments, diffusers, flow diverters or other flow modifying bodies may be implemented.

The fuel used in the cell 100 may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, semi-metals, "poor" metals, post-transition and transition metals, either in atomic, molecular (including metal hydrides), or alloy form when collected on the electrode body. However, the present invention is not intended to be limited to any specific fuel, and others may be used. The fuel may be provided to the cell 100 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application. Ser. No. 12/776,962, previously incorporated by reference above. In some embodiments, additives may be added to the ionically conductive medium, including but not limited to additives that enhance the electrodeposition process of the metal fuel on the fuel electrode 110, such as is described in U.S. patent application Ser. No. 13/028,496, previously incorporated by reference above. Such additives may reduce the loose dendritic growth of fuel particles, and thus the likelihood of such fuel particles separating from the fuel electrode 110, for example.

In various non-limiting embodiments, the fuel electrode 110, the oxidant reduction electrode 120 and the separate charging electrode 130 may be connected by a switching system that may be configured to connect the cell 100 to a power supply, a load, or other cells 100 in series and/or parallel. During discharge, the fuel electrode 110 is connected to the load, and operates as an anode so that electrons given off by the metal fuel, as the fuel is oxidized at the fuel electrode 110, flows to the external load. The oxidant reduction electrode 120 functions as the cathode during discharge, and is configured to receive electrons from the external load and reduce an oxidizer that contacts the oxidant reduction electrode 120, specifically oxygen in the air surrounding the cell 100, oxygen being fed into the cell 100, or oxygen recycled from the cell 100. During charge, the fuel electrode 110 is connected to the power supply, and operates as a cathode so that oxidized fuel within the ionically conductive medium is reduced at the fuel electrode 110. The charging electrode 130 functions as the anode during charge, and oxidizes the reduced oxidant that contacts the charging electrode 130, specifically evolving oxygen into the ionically conductive medium.

It may be appreciated that in various embodiments the oxygenated ionically conductive medium may have a tendency to rise upward and expand or "bloom" outwardly based solely on the buoyancy of the bubbles and the constrictions placed upon them by the various components of cell 100. In an embodiment, a gas vent 190 may be provided in the cell 100 configured to prevent loss of the ionically conductive medium therethrough, but allow the gas from the bubbles to escape from the cell 100. In some embodiments, areas above the level of the ionically conductive medium near or at the top of the cell housing 110 may be perforated or otherwise configured such that the gas may exit from the cell 100.

It may be appreciated that during charging and/or the discharging, gasses may be evolved as a byproduct of the electrochemical reactions. For example, in some embodiments, the electrochemical reactions occurring during charging of the cell 100 may be reduction-oxidation (redox) reactions. In an embodiment where the metal fuel is zinc, the ionically conductive medium may contain reducible zinc ions that are to be plated as zinc fuel on the fuel electrode 110. In one such embodiment, the reduction reaction takes place at the fuel electrode 110 (the reduction site), and may conform to $Zn(OH)_4^{2-}+2e^-\rightarrow Zn+4OH^-$. The corresponding oxidation reaction occurs at the charging electrode (i.e. the charging electrode 130), and may conform to $2OH^-\rightarrow H_2O+\frac{1}{2}O_2+2e^-$. The charging electrode 130 is therefore understood to be producing oxygen gas within the cell 100, and thus may be characterized as an oxygen evolving electrode. It may be appreciated that in some embodiments different metal fuels are utilized, and thus other reactions may occur, which may also evolve oxygen or other gases in the cell 100.

In an embodiment where the metal fuel is zinc, the oxidation reaction may correspond to the equation $Zn\rightarrow Zn^{2+}+2e^-$. The zinc ions may bond with hydroxide ions in the ionically conductive medium, in a manner that corresponds to $Zn^{2+}+OH^-\rightarrow Zn(OH)_4^{2-}$. The zincate ($Zn(OH)_4^{2-}$) could then flow in the ionically conductive medium, and be free to be reduced as zinc fuel at the fuel electrode 110 during a future charging of the cell 100. In some embodiments, hydrogen may also evolve within the cell 100 (i.e. within the housing 102). It may be appreciated that a parasitic corrosion reaction, or water reduction reaction, may occur corresponding to the equation $Zn+2H_2O\rightarrow Zn(OH)_2+H_2$. While such hydrogen gas may be in a much smaller quantity than the evolved oxygen, it may be appreciated that the presence of hydrogen within the cell 100 is generally undesirable.

Regardless of the type or source of gas or gasses present within the electrochemical cell 100, it may be appreciated that a gas vent may facilitate their removal, as described in greater detail below. For example, FIG. 1 depicts a cross-sectional view of a gas vent generally depicted at 190 installed into the housing 102, cut so that a cross section of a filter body 200 contained therein is visible. The filter body 200 may be positioned generally above the liquid ionically conductive liquid level L.

The gas vent 190 may comprise a filter housing 202 substantially surrounding the filter body 200 so as to form a filter chamber 204. The filter housing 202 may comprise a gas inlet 206 capable of receiving gases and electrolyte droplets in the form of a mist from gap G, and a gas outlet 208 capable of releasing gases out from the filter chamber 204. In the embodiment depicted in FIG. 1, the bottom portion of the housing 202 is essentially horizontal; however in other embodiments, the bottom portion of the housing 202 may be angled towards the volume of ionically conductive liquid such that excess amounts of the absorbed portion of the ionically conductive liquid in the channel is directed towards the volume of the ionically conductive liquid. Such an angle may vary across embodiments. It may be appreciated that the angle may be greater than zero degrees (horizontal), but less than 90 degrees (vertical). It may be appreciated that in such embodiments, gravity would direct the flow of ionically conductive medium that trickles down from the filter body 200 back into the quantity of ionically conductive medium through the gas inlet 206.

In various embodiments, the gas outlet 208 may contain or otherwise be associated with a valve, stopper, or other appropriate body configured to selectively close off the filter chamber 204, so that the cell 100 may be sealed closed, which may be beneficial when the cell 100 is being transported, stored, or so on. Additionally, the gas outlet 208 may terminate in a quick disconnect and/or have an O-ring seal, so as to facilitate connection of the filter chamber 204 to a water management system, a gas recapture system, a gas recirculation system, or any other such system that either facilitates addition of liquid into the cell 100 and/or removes gas therefrom. Additionally, in some embodiments the gas outlet 208 may include a gas-permeable liquid-impermeable membrane, which may keep the cell 100 generally sealed against unwanted loss of the ionically conductive medium, but would generally not be directly exposed to the ionically conductive medium that is trapped and filtered out by the filter 200. Such a configuration would not result in lengthy exposure of the hydrophobic membrane to the ionically conductive medium that could result in salt clogging the hydrophobic membrane when the ionically conductive medium dries.

According to an embodiment and with regard to FIG. 1 and FIG. 2 (*a*), the filter body 200 may be formed in a generally concave shape with an apex 200a positioned towards the top of the cell 100 in its upright orientation such that the surfaces of the filter body 200b extend downwardly from the apex 200a. It may be appreciated that this generally concave shape facilitates draining of absorbed (i.e. by the filter body 200) ionically conductive medium back into the interior cell chamber 104, as will be discussed in more detail below. The concavity may be of any suitable shape. For example, the shape may be selected from the group of: arched, domed, pyramidal, conical, parabolic and combinations thereof.

As described previously, a mist comprising ionically conductive medium may be present in gap G (i.e. generally above the level L). In an embodiment, the mist may be propelled under the influence of gas egress from the cell chamber 104, through gas inlet 206 and come into contact with at least a portion of filter body 200. In the illustrated embodiment of FIG. 1, only one gas inlet 206 is depicted, however, a plurality of distinct inlets or perforations may facilitate the flow of gas and mist therethrough. The particular design of gas inlet 206 and/or the distance between the liquid level L to the bottom of the filter housing 202 may determine the degree to which the filter body 200 becomes exposed to the mist or spray generated in the cell 100. For example, the distance between the liquid level L to the bottom of the filter housing 202 may range from 1 mm to 10 cm.

In an embodiment, the concave shape of the filter body 200 may facilitate removal of entrained electrolyte droplets from the multi-phase gas stream entering the filter chamber 204 through gas inlet 206. The filter layer 220 of the filter body 200 may comprise a filter material which may collect the entrained electrolyte droplets of the mist, for example by way of impingement (i.e. inertial impaction). As the collected mass of the liquid electrolyte droplets increases, larger liquid droplets and/or films may form by coalescence (i.e. agglomeration at filter material surfaces). These may be referred to as larger or coalesced droplets to differentiate them from the smaller droplets in the rising mist. The force of gravity may pull these larger liquid agglomerates down towards the bottom of filter housing 202. This motion of liquid agglomerates is generally depicted at arrows 222 to illustrate the draining action provided by the concave shape of filter layer 220. As the mass of liquid electrolyte collects towards the bottom of filter layer 220, these larger droplets may periodically separate from filter layer 220, drip towards the base of filter chamber 202 and drain back to the main volume of electrolyte through gas inlet 206.

It may be appreciated that the concave shape may inhibit saturation of the filter layer 220 by the liquid electrolyte droplets due to its inherent ability to drain absorbed electrolyte droplets back into the interior chamber 104. It may be further appreciated that the concave shape of the filter body 200 is designed to maximize surface area for liquid electrolyte droplet collection. Additionally, the design may maintain a low pressure drop therethrough by inherently ensuring the filter material does not become completely saturated by the liquid electrolyte droplets. In a non-limiting embodiment, the lower bound of the pressure drop may be 0.01 psig. In an embodiment, the gas flow rate through the filter 200 may be in the range of 1-1000 sccm. As a non-limiting example, a gas flow rate ca. 400 sccm through the filter body 200 may result in an equilibrium pressure drop of 0.05 psig. In comparison, an essentially horizontal filter may produce pressure drops greater than 0.3 psig, which may be due to a general inability to effectively drain liquid electrolyte therefrom, thereby becoming saturated with the liquid electrolyte.

In an embodiment, the filter layer 220 of the filter body 200 may comprise a gas permeable, liquid absorbent filter material which may collect the entrained electrolyte particles of the mist by way of impingement or any other suitable mechanism. The specifics of the layer may be selected based on the operating conditions of the cell 100 and properties such as but not limited to: thickness, porosity, density, permeability, hygrophobicity/hygrophilicity, hydrophobicity/hydrophilicity, mechanical strength, mechanical flexibility, chemical resistance, and combinations thereof. In an embodiment, the filter material may comprise fibers which essentially act as coalescing elements. The size and structure of the fibers may be selected based on the particle size of the liquid particles in the mist (which may be in turn related to gas flow rate) and their concentration in the gas stream. For example, the size of filter fibers may range from 1-100 microns, and in some embodiments may range from 5-60 microns.

In an embodiment, the filter layer may be at least partially hydrophobic which may facilitate coalescence and liquid droplet drainage as discussed previously. As a non-limiting example, the filter layer 220 may comprise a polypropylene felt. Such a material may be a non-uniform mat of random fibers formed by needle punching, in accordance with terms known in the textile arts. In various embodiments, the filter material may be in felt shape (i.e. flexible) or may be sintered to form a rigid porous layer, or be an arrangement of these materials. The filter layer 220 may comprise any suitable material. Non-limiting examples of such material include, but are not limited to: polypropylene, polyethylene, polyesters, fluoropolymers, acrylonitrile butadiene styrene (ABS), and Noryl (i.e. modified polyphenylene ether), combinations and derivatives thereof. In some embodiments, at least a portion of the material may be modified by surface treatments (e.g. modifying the hydrophobicity/hydrophilicity).

In some embodiments the filter may comprise porous metal foams, including but not limited to comprising metals such as steel, stainless steel, bronze, and copper, and may in some embodiments be coated with a metal layer such as Ni and its alloys.

In an embodiment, the filter material is supported in position by means of a filter frame 230. The filter frame 230 may be of any suitable dimension and material. For example, the filter frame 230 may be an injection moldable plastic. In an embodiment, the filter material is attached to the filter frame 230 so as to create a seal, thereby limiting gas flow only through the filter material. In an embodiment, the perimeter 240 of the filter material may be sealed via any appropriate method and/or sealant. For example, a thermoplastic material (e.g. ABS, rubberized polymers) may be molded around the filter material.

Figure 2A:
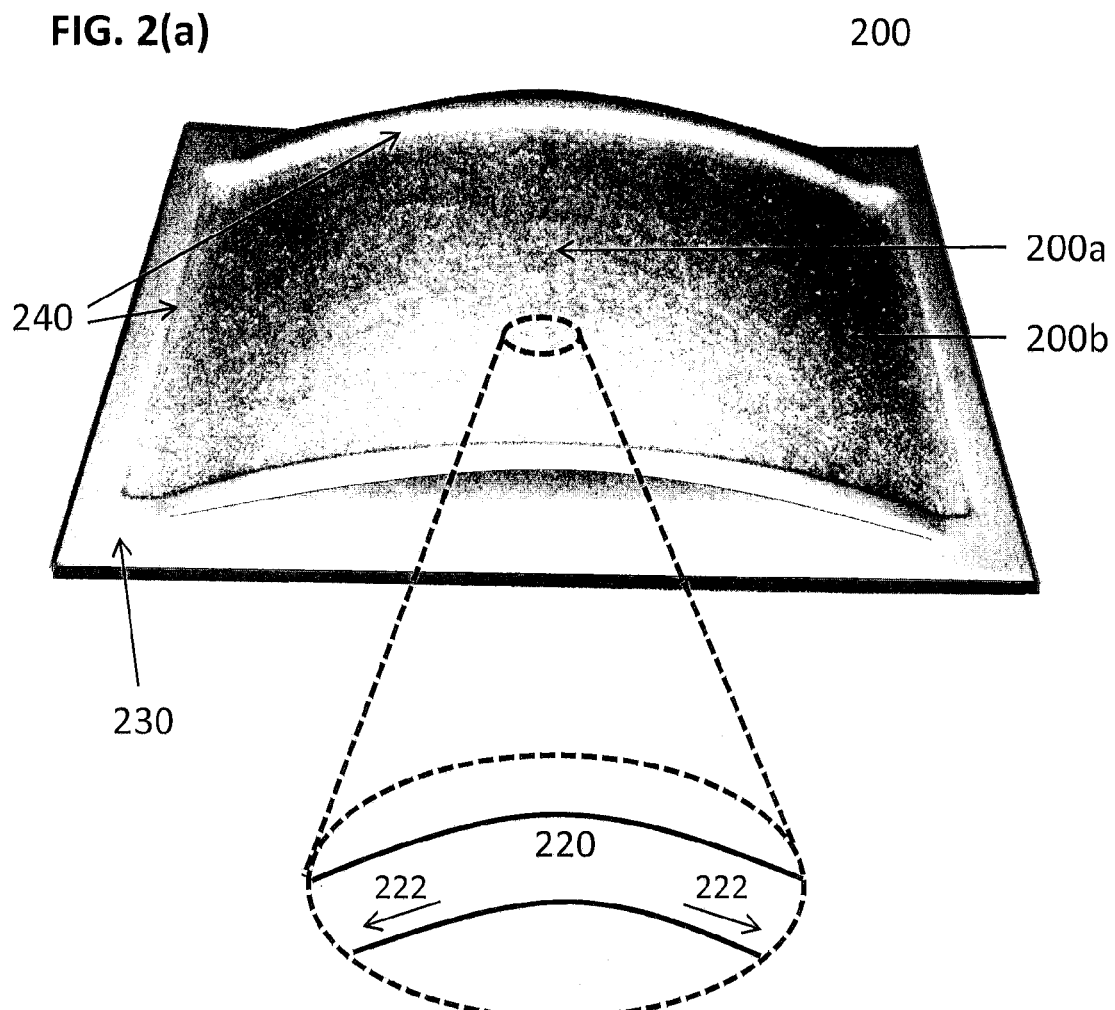
FIG. 2(a) depicts a perspective view of a filter body according to an embodiment of the invention comprising a single filter layer and FIG. 2(b) depicts a filter body comprising multiple layers.

The filter body 200 may be comprised of a single layer or several layers. Layers may be in close contact or in some embodiments, a gap between layers may be provided. Although only a single filter layer 220 is depicted in FIG. 2(a), the illustration is not intended to be limiting as any other suitable number of filter layers is possible depending on the desired operating characteristics. In some embodiments, the filter layer 220 may be formed from a single folded gas permeable material. In some embodiments, the layers of the filter body 200 may comprise a gradient (e.g. pore size gradient) or alternating sheets of hydrophilic and hydrophobic materials. In an embodiment, the thickness of the filter layers may range from 0.1 mm to 2 cm.

Figure 2B:
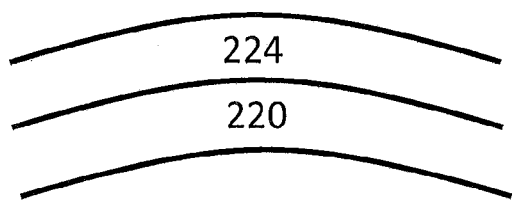

As in the illustrated embodiment of FIG. 2(b), a liquid barrier layer 224 may be provided in the filter body 200, generally above filter layer 220 which is gas permeable and liquid impermeable. The liquid barrier layer 224 may be in close physical contact with filter layer 220 wherein a wicking action may thereby be provided by the filter layer 220. In other embodiments, a gap may be defined between the liquid barrier layer 224 and filter layer 220. In an embodiment, the liquid barrier layer 224 may comprise a hygrophobic membrane such that the flow of ionically conductive medium from the interior cell chamber 104 is precluded when, for example, the cell is tilted or inverted. For example, the liquid barrier layer 224 may comprise a hydrophobic membrane of any suitable material. Non-limiting examples include but are not limited to: polypropylene (PP), fluoropolymers, polytetrafluoroethylene (PTFE), polyvinylidene fluoride (PVDF), ultra high molecular weight polyethylene (UPE), perfluoroalkoxy (PFA), fluorinated ethylene propylene (FEP), combinations and derivatives thereof. Although the materials of the liquid barrier layer 224 may vary across embodiments, it is only essential that it be gas permeable and impermeable to the liquid ionically conductive medium. In various embodiments, the materials may comprise PTFE (also known as Teflon®), which may in some embodiments be thermo-mechanically expanded (also known as expanded PTFE, or Gore-Tex®). These materials are not intended to be limiting, as any suitable material may be selected based on cell chemistry, structural stability and so on. It is only essential that it is gas permeable and impermeable to the liquid ionically conductive medium.

In some embodiments the gas outlet 208 may also function as a liquid inlet. In some such embodiments, additional ionically conductive medium (or water, or any other appropriate liquid), may be poured or otherwise released into the gas outlet 208, so that it may traverse the filter body 200, and enter into the housing 102. In some embodiments, a fluid management system may be provided in the cell 100, and may determine the height of the liquid level L, for example such as that described by U.S. Provisional Patent Application No. 61/763, 428. If, for example, the level L drops by a certain amount, or to a certain level, the fluid management system may be configured to release more ionically conductive medium into the cell 100, such as through the filter chamber 202. In an embodiment, the fluid management system may comprise a level sensor configured to determine the level L of the ionically conductive medium. Such a level sensor may in various embodiments be configured to determine the height of the ionically conductive medium L, or may be configured to determine the height of gap G in the cell 100.

It may be appreciated that other mechanisms for limiting or suppressing unwanted gasses may be utilized in addition to the filter body 200. For example, to limit or suppress hydrogen evolution at the fuel electrode 110, which in some cases may occur during the discharge mode or during quiescent (open circuit) periods of time, salts may be added to retard hydrogen evolving reactions. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. Additionally, other additives may also or alternatively be added to the ionically conductive medium, including, but not limited to additives which enhance the electrodeposition process of the metal fuel on the fuel electrode 130, such as is described in U.S. patent application Ser. Nos. 13/028,496 and 13/526,432, incorporated herein by reference.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

The invention claimed is:

1. An electrochemical cell system comprising:
(i) a fuel electrode;
(ii) an oxidant electrode for absorbing and reducing a gaseous oxidant;
(iii) an interior cell chamber configured to contain a volume of ionically conductive liquid therein, wherein the ionically conductive liquid conducts ions between the fuel and oxidant electrodes, and wherein the oxidant electrode separates the ionically conductive liquid from the gaseous oxidant; and
(iv) a gas vent configured to separate gas in the cell from a mist comprising the ionically conductive liquid and positioned generally above the volume of ionically conductive liquid, the gas vent comprising:

a filter body portion comprised of at least one layer for absorbing a portion of the ionically conductive liquid;
wherein the filter body portion is formed in a concave shape with an apex directed upwardly in the cell's upright orientation, and body surfaces extending downwardly from said apex so as to drain absorbed ionically conductive medium back into the interior cell chamber; wherein the filter body portion contains pores so as to permit permeation of the gas therethrough.

2. The electrochemical cell system of claim 1, wherein the concave shape is selected from the group of: arched, domed, pyramidal, conical parabolic and combinations thereof.

3. The electrochemical cell system of claim 1, wherein the at least one layer comprises an absorbent material.

4. The electrochemical cell system of claim 1, wherein the at least one layer comprises a fibrous filter material.

5. The electrochemical cell system of claim 1, wherein the at least one layer comprises a hygrophobic material.

6. The electrochemical cell system of claim 1, wherein the at least one layer comprises polypropylene, polyethylene, polyesters, fluoropolymers, polyphenylene ethers, acrylonitrile butadiene styrene, combinations and derivatives thereof.

7. The electrochemical cell system of claim 1, wherein the at least one layer comprises a felt.

8. The electrochemical cell system of claim 1, wherein the gas vent further comprises a liquid barrier layer such that, flow of ionically conductive medium from the interior cell chamber is precluded when the cell is inverted.

9. The electrochemical cell system of claim 8, wherein the liquid barrier layer comprises a hygrophobic material.

10. The electrochemical cell system of claim 8, wherein the liquid barrier layer comprises a hygrophobic membrane.

11. The electrochemical cell system of claim 8, wherein the liquid barrier layer comprises polypropylene, fluoropolymers, polytetrafluoroethylene, polyvinylidene fluoride, polyethylene, perfluoroalkoxy, fluorinated ethylene propylene, combinations and derivatives thereof.

12. The electrochemical cell system of claim 1, further comprising a housing substantially surrounding the filter body portion so as to form a filter chamber.

13. The electrochemical cell system of claim 12, wherein a bottom portion of the housing is angled towards the volume of ionically conductive liquid such that excess amounts of the absorbed portion of the ionically conductive liquid in the filter chamber is directed towards the volume of the ionically conductive liquid.

14. The electrochemical cell system of claim 1, wherein the gas vent comprises a gas outlet configured to permit permeation of the gas therethrough, while preventing permeation of the ionically conductive liquid.

15. The electrochemical cell system of claim 14, wherein the gas vent comprises a hydrophobic membrane extending across the gas outlet.

* * * * *